May 10, 1966 YVES-JEAN FRANCOIS BRETTE 3,250,921

BISTABLE ELECTRIC DEVICE

Filed March 30, 1964 3 Sheets-Sheet 1

May 10, 1966 YVES-JEAN FRANCOIS BRETTE 3,250,921

BISTABLE ELECTRIC DEVICE

Filed March 30, 1964 3 Sheets-Sheet 2

May 10, 1966 YVES-JEAN FRANCOIS BRETTE 3,250,921

BISTABLE ELECTRIC DEVICE

Filed March 30, 1964 3 Sheets-Sheet 3

United States Patent Office 3,250,921

Patented May 10, 1966

3,250,921

BISTABLE ELECTRIC DEVICE

Yves-Jean Francois Brette, Sevres, France, assignor to Compagnie des Machines Bull (Societe Anonyme), Paris, France Filed Mar. 30, 1964, Ser. No. 355,644
Claims priority, application France, Apr. 12, 1963, 931,415, Patent 1,361,544
5 Claims. (Cl. 307—88.5)

The present invention relates to static electric devices having two stable states which are controlled by binary electric signals, and it concerns more particularly devices of this type in which the signal transmission circuits comprise only resistances and condensers.

Many electric devices having two stable states controlled by binary electric signals are known. Some of the signal transmission circuits comprised in these devices include diodes which transmit the signals and the function of which, under certain operating conditions, is to isolate these devices from those to which they are connected or to isolate from one another certain component elements of these devices.

In addition, some signal transmission circuits comprised in these devices, when the latter operate as a binary counting flip-flop or as a shift register, include inductances intended to introduce a predetermined delay into the transmission of the signals.

One object of the invention is to avoid the use of diodes and inductances in the transmission circuits of devices of this type.

A device having two stable states according to the invention consists of a symmetrical electrical circuit comprising two inverting threshold logical circuits of threshold two, each having at least one input of weight two, two inputs of weight one and one output, one input of weight two of each of the logical circuits being connected to the output of the other, the said device being characterised in that each of the said logical circuits comprises a delay circuit connected to one of its inputs of weight one, and in that such a delay circuit is formed of two resistances disposed in series and of a condenser, of which one electrode is connected to the common point of these two resistances, while its other electrode is connected to a source of reference potential.

A device according to the invention may be employed in information-processing systems, for example to form binary counting flip-flops and shift registers employed in such systems.

The various objects, features and advantages of the present invention will become apparent from the following description and from the accompanying drawings, in which.

Figure 1:
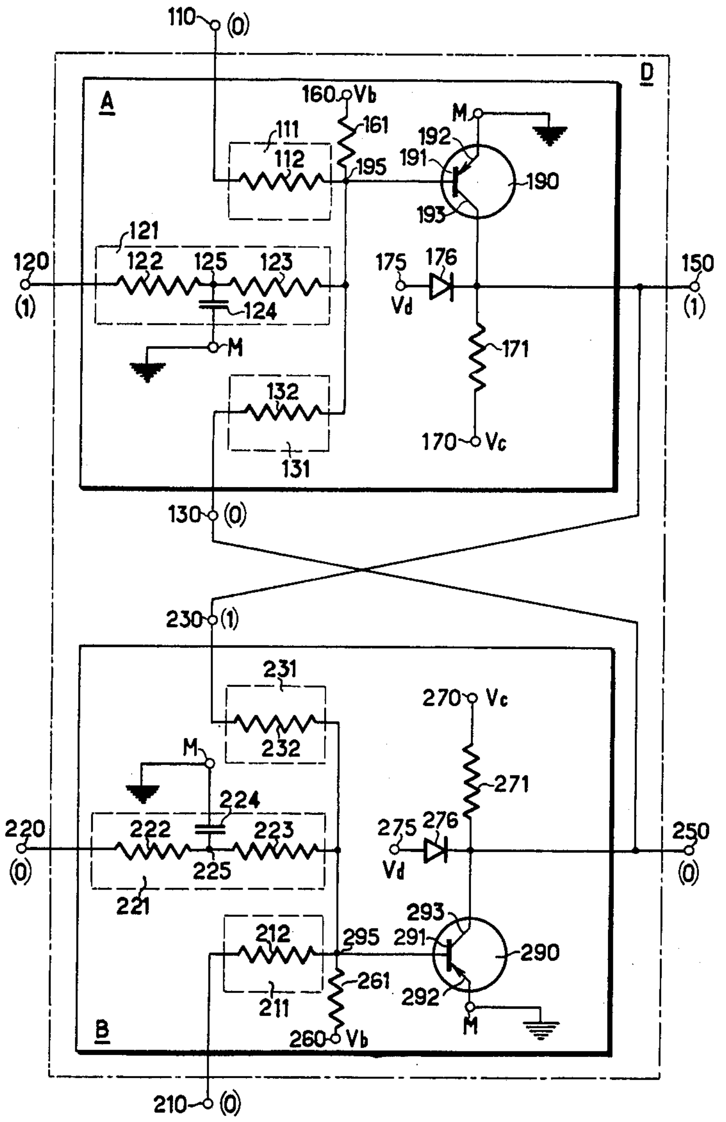
FIGURE 1 illustrates an electric device having two stable states according to the invention.

A device having two stable states according to the invention consists of the whole of the circuit D illustrated in FIGURE 1. This circuit comprises two identical arrangements A and B. Referring to the arrangement A, for example, it will be seen that it comprises a number of input terminals 110, 120 and 130 hereinafter respectively designated: control input, selection input, feedback input, an output terminal 150, terminals 160, 170 and 175 brought to bias potentials V*b*, V*c* and V*d* respectively, two terminals M which are at the reference potential normally constituted by earth, a transistor 190 having a base 191, an emitter 192 and a collector 193, a terminal 195 connected to the base 191 of the transistor and constituting the input for the control signals of the transistor, input circuits 111, 121 and 131 connecting the input terminals 110, 120 and 130 respectively to the input terminal 195 of the transistor, a return resistance 161 connecting the input terminal 195 to the terminal 160, a collector load resistance 171 connecting the collector 193 to the terminal 170, and an abutment diode 176 disposed between the collector 193 and the terminal 175.

The values of the potentials V*b* and V*c* are chosen with due regard to the characteristics of the elements of the arrangement and in such manner that the collector-base junction of the transistor is always inversely biassed and that the emitter-base junction of the transistor is biassed in the inverse or forward direction depending upon the values of the potentials applied to the inputs of the arrangement. The value of the potential V*d* is so chosen as to impart a predetermined value to the potential set up at the output terminal 150 of the arrangement when the transistor is non-conductive, the diode 176 being so oriented as to be biassed in the forward direction.

The input circuits 111 and 131 consist of resistances 112 and 132 respectively, the value of the resistance 132 being equal to half the value of the resistance 112.

The input circuit 121 consists of two resistances 122 and 123 arranged in series between the selection input 120 and the input 195 of the transistor, and of a condenser 124, of which one electrode is connected to the junction point 125 of the resistances 122 and 123, while its other electrode is connected to a terminal M. The value of the resistances 122 and 123 is such that their sum is equal to the value of the resistance 112.

The elements of the arrangement B are the same as those of the arrangement A and the like elements of the two arrangements have been denoted in the figures by reference numerals which differ only by the hundreds digit.

Considering, for example, the arrangement A, it will be seen that the value of the potential which is set up under stable operating conditions at the input 195 of the transistor 190 depends upon the values of the potentials applied to the inputs 110, 120 and 130 of the arrangement, and that a change in the value of the potential applied to one of the inputs of the arrangement brings about a corresponding change in the value of the potential applied to the input of the transistor, under otherwise equal conditions. However, it will be seen that owing to the existence of the condenser 124 in the input circuit 121, the latter has a delay characteristic in the sense that a change of the potential applied to the selection input 120 brings about a corresponding change of the potential applied to the input 195 of the transistor only with a predetermined delay whose value depends upon the time constant of the input circuit 121. In other words, if a change of the potential applied to the selection input 120 takes place at a given instant, the potential applied to the input of the transistor only reaches after a predetermined time interval the value which corresponds under stable operating conditions to the value assumed by the potential applied to the selection input 120 as a result of the said change, and the value of this time interval is a predetermined function of the time constant of the input circuit 121.

In the construction of the arrangement such as A or B described in the foregoing, there is employed, for example, a commercial transistor whose characteristics are such that it is in the saturated state when the current emanating from its base is higher than 80 $\mu$a. and in the non-conductive state when the potential of its base is higher by 0.25 volt than the potential of its emitter.

For appropriately chosen values of the load resistance 171 and of the potentials Vc and Vd of an arrangement such as A in which a transistor having the above-indicated characteristics is employed, the potential of the output terminal 150 takes a value of about −0.15 volt or −12 volts depending upon whether the transistor employed is saturated or non-conductive. In the following, it will be assumed that these potential values of −0.15 volt and −12 volts represent the binary values 0 and 1 respectively. In order to simplify the description, these binary values will be employed to denote these potential values, and a potential having either one of these two values will be called a binary signal.

When the characteristics of the transistors which must be employed in an arrangement such as A or B are known, it is sufficient to choose appropriately the values of the resistances forming the input circuits of such an arrangement and the value of the bias potential V*b* in order that this arrangement may supply at its output, under stable operating conditions, a binary signal representing the complementary value of the logical operation described as "majority (or threshold) of threshold two," which is performed on three binary variables represented in accordance with the above-indicated convention by binary signals applied to its inputs, two of the inputs of this arrangement (i.e. the inputs 110 and 120 in regard to the arangement A) having the weight one, and another (the input 130 in the case of the arrangement A) the weight two.

When it is thus adjusted, an arrangement such as A, to the inputs of which binary signals are applied in any possible combinations, a binary signal being applied to each of its inputs, operates in the following manner: if no binary signal of value 1 is applied to its inputs, or if such a signal is applied only to one of its inputs of weight one (that is to say to either one of its inputs 110 and 120), the transistor included in this arrangement is rendered non-conductive and a binary signal of value 1 appears at its output. If, on the other hand, a binary signal of value 1 is applied to its input of weight two (i.e. to its input 130) or if such a signal is applied simultaneously to any two of its inputs, or simultaneously to three inputs, the transistor is saturated and a binary signal of value 0 appears at its output. Consequently, if a binary signal is applied to each of the inputs of such an arrangement, there appears at its output a binary signal which takes the value 1 or 0 depending upon whether the sum of the weights of the inputs to each of which a binary signal of value 1 is applied is less than two or is at least equal to two. Such an arrangement is usually denoted by the expression "inverting majority logical circuit of threshold two, having three inputs of weights, one, one and two respectively."

For the construction of the device having two stable states according to the invention, the ouput terminal 150 of the arrangement A is connected to the input terminal 230 of the arrangement B, and the output terminal 250 of the arrangement B is connected to the input terminal 130 of the arrangement A, as shown in FIGURE 1.

As long as the binary signals applied to the control inputs 110 and 210 of the device according to the invention simultaneously have the value 0, the device is maintained in one of its two stable states, regardless of the value of the binary signals applied to its selection inputs 120 and 220. One of the two stable states of the device is indicated in FIGURE 1 and will be called the zero state of the device. This state is characterised by the fact that the arrangement A supplies at its output a signal 1 and the arrangement B a signal 0. The other stable state, or state one, of the device is characterised by the fact that the arrangements A and B supply at their respective outputs a signal 0 and a signal 1 respectively. It may be verified that each of these states is stable. Considering, for example, the state zero indicated by FIGURE 1, it will be seen that the signal 1 appearing at the output 150 of the arrangement A and applied to the feedback input 230 of the arrangement B, determines the occurrence of the signal 0 at the output 250 of this arrangement B, regardless of the value of the signal applied to the selection input 220 of this arrangement, because the selection input is an input of weight one, while the feedback input is an input of weight two. It will then be seen that the arrangement A necessarily supplies a signal 1 at its output 150, regardless of the value of the signal applied to its selection input 120, which is an input of weight one, since a signal 0 is applied to each of its two other inputs.

There will now be described a control operation for bringing the device from one of its stable states to the other.

Such a control operation is carried out when the signals applied to the control inputs of the device simultaneously take the value 1 during an interval of time of which the duration is within certain limits which will hereinafter be defined.

If the signals applied to the control inputs of the device take the value 1 at an instant when the device is in one of its stable states and when the value of the signal applied to the selection input of each of the arrangements A and B forming the device is that of the signal supplied at the output of this arrangement, the device takes its other stable state.

If the signals applied to the control inputs 110 and 210 of the device simultaneously take the value 1, while the device is, for example, in the state zero indicated by FIGURE 1, and while the values of the signals applied to the selection inputs 120 and 220 are the values 1 and 0 respectively of the signals supplied at the outputs 150 and 250, the signal supplied at the output 150 of the arrangement A takes the value 0, because a signal 1 is then applied both to the control input 110 and to the selection input 120 of this arrangement. It follows that the signal applied to the feedback input 230 of the arrangement B takes the value 0. Now, the signal applied to the selection input 220 of this arrangement also has the value 0 at the instant when the signals applied to the control inputs 110 and 210 have taken the value 1, and consequently the signal supplied at the output 250 of the arrangement B takes the value 1 as soon as the signal applied to the feedback input 230 of this arrangement has taken the value 0. The signal applied to the feeback input 130 of the arrangement A then takes the value 1 and this arrangement A continues to supply a signal 0 at its output after the signal applied to its control input 110 has taken the value 0.

It is to be noted that the time interval separating the instant of the application of the control signals from the instant when the signal applied to the feedback input 130 of the arrangement A takes the value 1 constitutes a lower limit of the interval of time during which the signals applied to the control inputs must take the value 1 in order to bring about a change of the stable state of the device.

It will also be noted that if the signal applied to the selection input 220 of the arrangement B takes the value 1 from the instant when the signals applied to the control inputs 110 and 210 of the device have taken the value 1, the potential applied to the input 295 of the transistor 290 only reaches the value which corresponds, under stable operating conditions, to the value 1 of the signal applied to the selection input 220 after an interval of time equal to a predetermined function of the time constant of the input circuit 221 connecting the selection input 220 to the input 295 of the transistor. This predetermined function of the said time constant therefore constitutes an upper limit of the time interval during which the signal supplied to the control inputs must take the value 1 in order to bring about a single change of the stable state of the device.

If the signals applied to the control inputs of the device simultaneously take the value 1 at an instant when the device is in one of its stable states and when the value of the signal applied to the selection input of each of the arrangements A and B is that of the signal supplied at the output of the other arrangement, the device remains in its stable state.

If, for example, the device is in the state 0 indicated by FIGURE 1 at the instant when the signals applied to the control inputs 110 and 210 simultaneously take the value 1 and if at this instant the values of the signals applied to the selection inputs 110 and 220 are 0 and 1 respectively, the arrangement A continues to supply a signal of value 1, because, of the signals applied to the various inputs of this arrangement, only that one which is applied to the control input 110 takes the value 1 at the said instant, and the arrangement B continues to supply a signal of value 0 because the signals applied to the three inputs of this arrangement all have the value 1 at the said instant.

In conclusion, the operation of the device may be summarised as follows: if the signals applied to the control inputs simultaneously take the value 1 at an instant when the device is in one of its stable states and when the signals applied to the selection inputs are complementary to one another, the state taken by the device at the instant when the signals applied to the control inputs again take the value 0 after an interval of time which is within the above-defined limits, is that in which the value of the signal supplied at the output of each of the arrangements A and B is the same as that of the signal applied to the selection input of the other arrangement at the instant when the signals applied to the control inputs take the value 1.

The device may therefore be made to take either one of its two stable states by performing the above-indicated control operation, which consists in simultaneously applying signals of value 1 to the control inputs at the instant when the stable state which is to be taken by the device is displayed by a particular appropriate combination of values of the signals applied to the selection inputs.

In order to force the device to take either one of its stable states without resorting to this control operation, it is possible to force the potential of the output terminal of the arrangement whose transistor is to be saturated when the device is in the desired stable state to take effectively the value which this potential would have if the said transistor were saturated, this being done by momentarily applying this potential to the said output terminal through an appropriately oriented diode. If, for example, it is desired to force the device to take the stable state opposite to that indicated in FIGURE 1, it is sufficient to change the potential normally applied to the terminal 175 of the arrangement A so that the said potential momentarily takes the value −0.15 volt. This potential, which constitutes what has previously been called the signal of value 0, is applied through the diode 176 to the output terminal 150 of the arrangement A and thus to the feedback input 230 of the arrangement B, so that the signal supplied at the output of the latter arrangement takes the value 1. A signal of value 1 is thus applied to the feedback input 130 of the arrangement A, of which the output signal then takes the value 0 in a stable manner.

Figure 2:
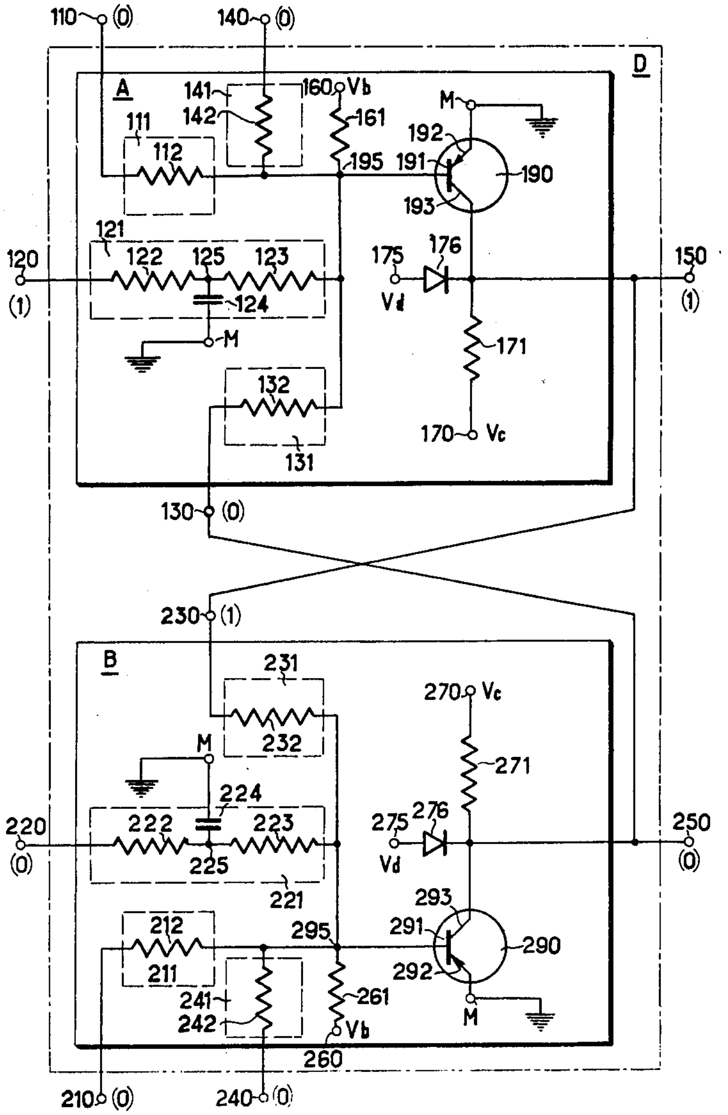
FIGURE 2 illustrates a modified construction of the device illustrated in FIGURE 1.

FIGURE 2 illustrates a device according to the invention comprising particular means for forcing the potential to take either one of its two stable states without resorting to the previously indicated control operation. This device differs from that illustrated in FIGURE 1 only by the presence of an additional input of weight two in each of the arrangements A and B. This additional input (140 in the case of the arrangement A and 240 in the case of the arrangement B), designated the forcing input, is connected to the base of the transistor of the arrangement by an input circuit (141 in the case of A and 241 in the case of B), consisting of a resistance (142 in the case of A and 242 in the case of B), the value of which is equal to half that of the resistance 112. Each of the arrangements A and B is arranged to operate as a majority inverting logical circuit of threshold two, having four inputs of weights one, one, two and two respectively, the relative values of the resistances of the input circuits and of the bias resistance being such that, taking into account the relative values of the potentials applied to these resistances and to the electrodes of the transistor, the latter is saturated or rendered non-conductive depending upon whether the sum of the weights of the inputs to which a signal of value 1 is applied is at least equal to two or lower than two.

The signals applied to the forcing inputs are normally maintained at the value 0. A forcing operation takes place by momentary application of a signal of value 1 to the forcing input of the arrangement whose output signal has to take the value 0.

Figure 3:
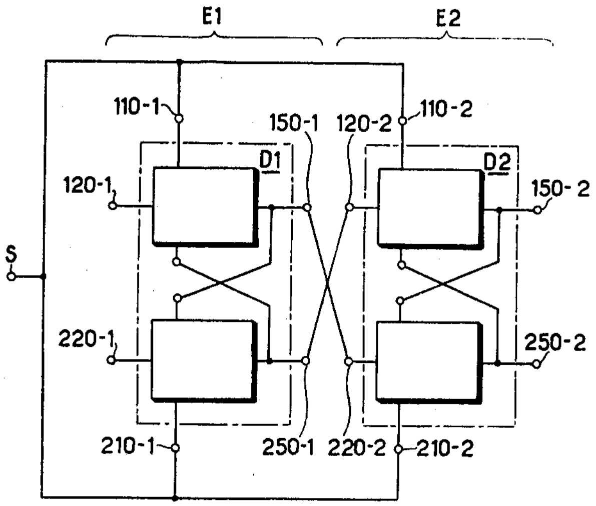
FIGURE 3 illustrates a shift register employing devices according to the invention.
Figure 4:
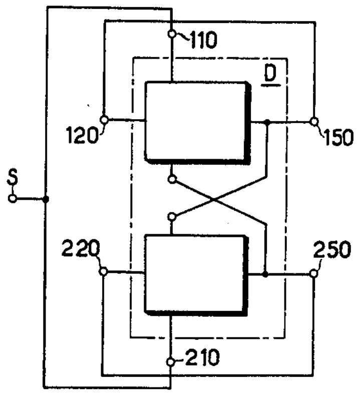
FIGURE 4 illustrates a binary counting flip-flop employing a device according to the invention.

FIGURES 3 and 4 show by way of example how the devices according to the invention may be employed to form a shift register and a flip-flop respectively.

FIGURE 3 illustrates a two-stage shift register. Each of the stages E1 and E2 of this register comprises a device having two stable states, namely D1 in the case of the stage E1 and D2 in the case of the stage E2, in accordance with the invention. The reference numerals serving to denote the inputs and outputs of each of the devices D1 and D2 in FIGURE 3 are formed by the reference numerals of the corresponding elements of the device illustrated in FIGURE 1, each followed by the digit 1 or the digit 2, depending upon whether they denote elements of the device D1 or of the device D2.

The outputs 150–1 and 250–1 of the device D1 are connected to the selection inputs 220–2 and 120–2 of the device D2 respectively. A binary signal source S is connected to the control inputs 110–1, 210–1, 110–2 and 210–2 of the devices D1 and D2. This source supplies a signal which has alternately one of the values 0 and 1 and the interval of time during which this signal can take the value 1 is between the limits defined in that part of the present description which relates to the operation controlling the change of state of a device according to the invention.

If, under the conditions which have previously been defined, the source S supplies a signal of value 1 during such an interval of time, the state in which each of these devices D1 and D2 finds itself when the signal supplied by the source S returns to the value 0 at the end of this interval of time, is determined by the values which were possessed by the signals applied to its selection inputs at the beginning of this interval of time even if the values of these signals change before the change of state of the devices D1 and D2 is completed, because a change of value of these signals affects the operation of these devices only after a delay determined by the time constant of the circuit which connects the selection input to the input of the amplifier in each of these devices. By virtue of the mode of operation just described, the state of the device D2 forming the stage E2 at the end of such an interval of time is the state of the device D1 forming the stage E1 at the beginning of this interval of time.

A device D having two stable states according to the invention is employed to form the flip-flop illustrated in FIGURE 4. The outputs 150 and 250 of the device B are connected to its selection inputs 120 and 220 respectively. A binary signal source S is connected to its control inputs 110 and 210. The interval of time during which a binary signal supplied by the source S can take the value 1 is within the limits previously defined. Under these conditions, the device D changes its stable state each time the signal supplied by the source takes the value 1.

I claim:

1. A bistable electric device comprising a first and a second threshold logical circuit, each having a first and a second input with an input weight of one unit, a third input with an input weight of two units, and an output for producing a binary signal level representing the complementary value of the result of a threshold logical operation, with a threshold of two units, performed on binary signal levels applied to the inputs of the circuit, the output of each circuit being connected to the third input of the other circuit, and the second input of each circuit including an R-C delay line for causing a binary signal level applied thereto to act on the circuit after a predetermined delay which is superior to the duration of the switching of the device from either one of its stable states to the other, whereby the device can assume either one of its stable states as long as a selected binary "zero" signal level is applied to the first input of both circuits, a selected binary "one" signal level and the binary "zero" signal level being respectively produced on the first circuit and on the second circuit output, or vice versa, according to whether the device assumes one or the other of its stable states, and whereby the device can be switched from either one of its stable states to the other whenever the binary "one" signal level is applied to the first input of both circuits, from a moment when the signal level applied to the second input of each circuit is the same as the signal level produced on the output of the circuit, for a duration which is inferior to said predetermined delay and which is not inferior to said switching duration.

2. A bistable electric device according to claim 1, wherein each threshold logical circuit has a fourth input with an input weight of two units.

3. In combination a bistable electric device according to claim 1, means for connecting the output of each threshold logical circuit of the device to the second input of the circuit, and means for alternately applying binary "zero" and binary "one" signal levels to the first input of both circuits, the binary "one" signal level each time being applied for a duration which is inferior to said predetermined delay and which is not inferior to said switching duration.

4. In combination, a series of identical bistable electric devices as claimed in claim 1, arranged in a chain, means for connecting the output of the first threshold logical circuit and the output of the second threshold logical circuit of the bistable electric device occupying a given place in the chain respectively to the second input of the second threshold logical circuit and to the second input of the first threshold logical circuit of the bistable electric device occupying the next successive place in the chain, means for applying a pair of opposite binary signal levels respectively to the second input of the first threshold logical circuit and to the second input of the second threshold logical circuit of the bistable electric device occupying the first place in the chain, and means for alternately applying binary "zero" and binary "one" signal levels to the first input of both threshold logical circuits of every bistable electric device of the series, the binary "one" signal level each time being applied for a duration which is inferior to said predetermined delay and which is not inferior to said switching duration.

5. A bistable electric device comprising a first and a second threshold logical circuit each having:

(a) a first and a second input terminal,
(b) a switching arrangement including biassing means, an input line and an output line,
(c) an output terminal connected to the switching arrangement output line,
(d) a resistance network comprising a first, a second and a third resistance connected in parallel between the input line of the switching arrangement and the first input terminal of the circuit, the second input terminal of the circuit and the output line of the other circuit respectively, the second resistance being provided with a tapping connected to a bias potential through a capacitor, the series resistance provided by the third resistance being half that provided by either the first or the second resistance, and the switching arrangement being adapted and biassed, and the resistances of the resistance network being chosen so that there is produced on the switching arrangement output line:
    (I) a selected binary "one" signal level, when a selected binary "zero" signal level is applied to the third resistance and to one or more of the first and second resistance,
    (II) the said "zero" signal level, when said one signal level is applied to both the first and the second resistance or to the third resistance at least.

No references cited.

ARTHUR GAUSS, *Primary Examiner.*

D. D. FORRER, *Assistant Examiner.*